United States Patent
Sjostrom et al.

(10) Patent No.: US 11,618,640 B2
(45) Date of Patent: Apr. 4, 2023

(54) METHODS AND APPARATUS TO POSITION A CARGO UNIT IN A CARGO COMPARTMENT OF AN AIRCRAFT

(71) Applicant: The Boeing Company, Chicago, IL (US)

(72) Inventors: Brett Dayton Sjostrom, Champlin, MN (US); Jose A. Cantos, Brooklyn, NY (US); Kenneth M. LaSalle, Marysville, WA (US)

(73) Assignee: THE BOEING COMPANY, Arlington, VA (US)

( * ) Notice: Subject to any disclaimer, the term of this patent is extended or adjusted under 35 U.S.C. 154(b) by 325 days.

(21) Appl. No.: 16/853,162

(22) Filed: Apr. 20, 2020

(65) Prior Publication Data

US 2021/0323779 A1    Oct. 21, 2021

(51) Int. Cl.
*B64C 1/20* (2006.01)
*B65G 54/02* (2006.01)
*B64D 9/00* (2006.01)
*B65G 67/00* (2006.01)

(52) U.S. Cl.
CPC ............. *B65G 67/00* (2013.01); *B64D 9/00* (2013.01); *B65G 54/02* (2013.01); *B65G 2814/0398* (2013.01)

(58) Field of Classification Search
CPC .......... B65G 54/02; B65G 67/00; B64D 9/00; B64C 1/20
USPC .................................. 244/118.1, 119; 701/3
See application file for complete search history.

(56) References Cited

U.S. PATENT DOCUMENTS

| | | | | |
|---|---|---|---|---|
| 6,059,229 A * | 5/2000 | Luria | ..................... | B65G 1/133 |
| | | | | 198/465.1 |
| 6,899,036 B2 * | 5/2005 | Lamb | ..................... | B61B 13/08 |
| | | | | 198/619 |
| 7,534,082 B2 * | 5/2009 | Rawdon | ................. | B65G 67/20 |
| | | | | 414/679 |
| 7,815,031 B2 * | 10/2010 | Schneider | ............ | B63B 25/004 |
| | | | | 414/143.2 |
| 9,302,745 B2 * | 4/2016 | Wang | ..................... | B63B 25/004 |
| 9,315,322 B1 * | 4/2016 | Majied | ................. | B65G 1/0471 |
| 9,340,286 B2 * | 5/2016 | Panzram | ................. | B64D 9/00 |
| 9,475,580 B2 * | 10/2016 | Lange | ..................... | B64D 11/04 |
| 9,718,627 B2 * | 8/2017 | Cifelli | ................... | B65G 63/065 |
| 9,738,402 B2 * | 8/2017 | Brown | ...................... | B64C 1/20 |
| 9,783,301 B2 * | 10/2017 | Schliwa | ............ | B64D 11/0007 |
| 9,937,997 B2 * | 4/2018 | Himmelmann | ........... | B64C 1/22 |
| 10,196,146 B2 * | 2/2019 | Himmelmann | ........... | B64C 1/22 |
| 10,399,661 B2 * | 9/2019 | Lampe | ..................... | B64D 9/00 |

* cited by examiner

*Primary Examiner* — Douglas A Hess
(74) *Attorney, Agent, or Firm* — Hanley, Flight & Zimmerman, LLC

(57) ABSTRACT

Methods and apparatus to position a cargo unit in a cargo compartment of an aircraft are disclosed herein. An example linear track system in a cargo compartment of an aircraft includes a first linear synchronous motor (LSM) track coupled to a floor of the cargo compartment, a second LSM track coupled to the floor of the cargo compartment, and a cargo positioning system to activate the first and second LSM tracks to move a cargo unit along the first and second LSM tracks through the cargo compartment. A bottom of the cargo unit has first and second strips of conductive material to interact with the corresponding first and second LSM tracks.

20 Claims, 8 Drawing Sheets

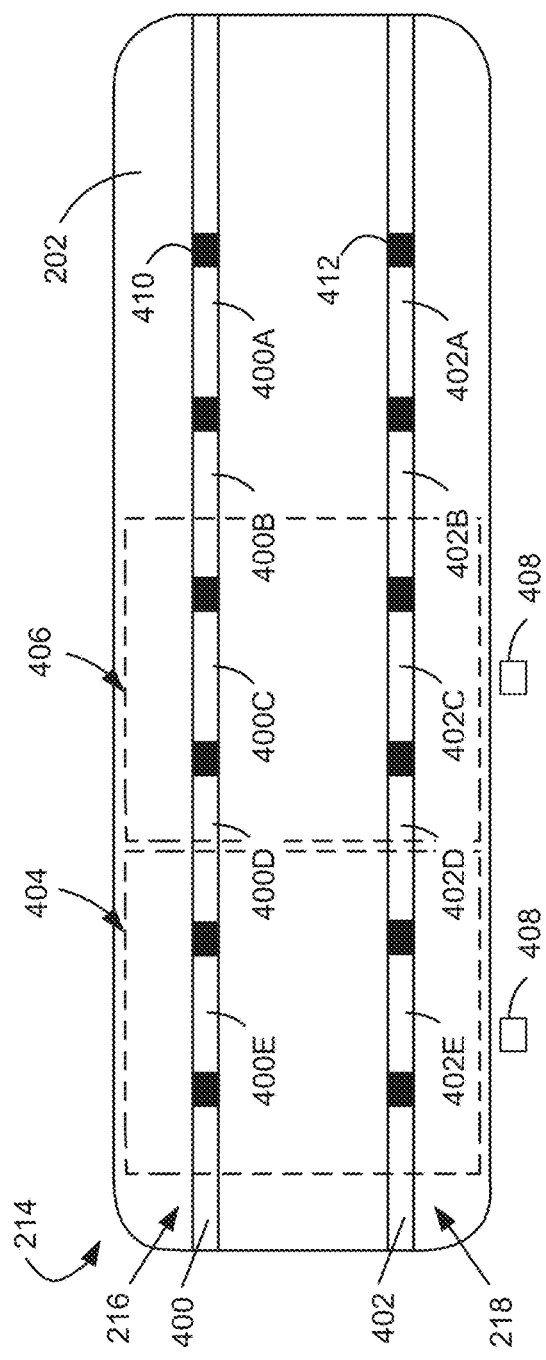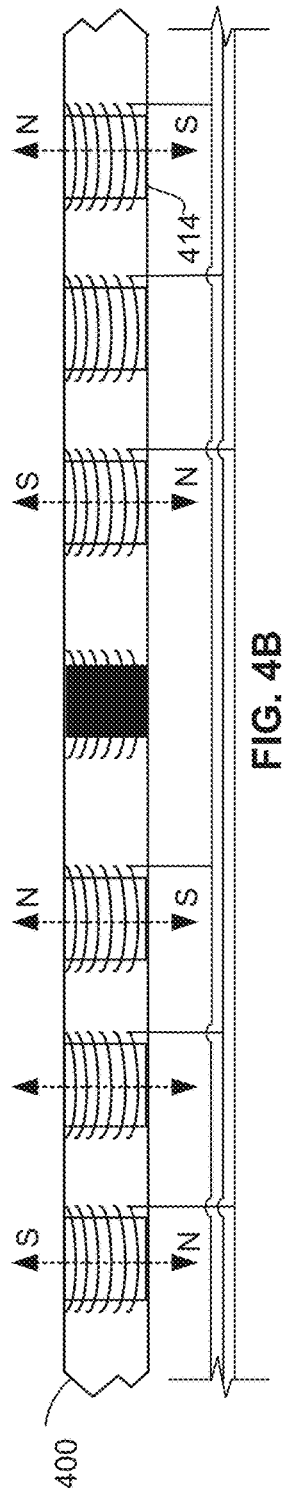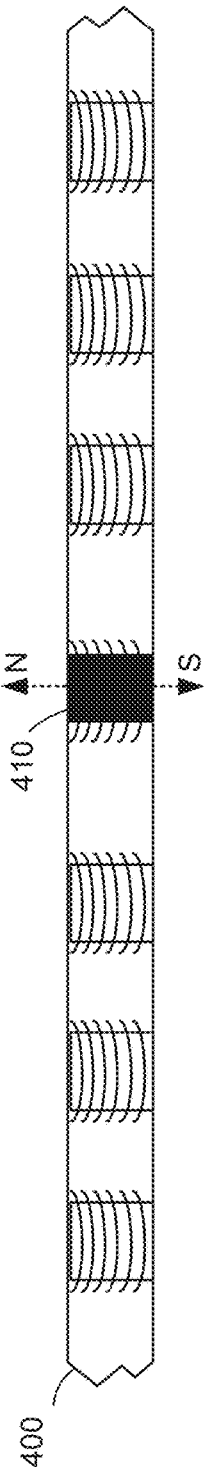
FIG. 4A
FIG. 4B
FIG. 4C

METHODS AND APPARATUS TO POSITION A CARGO UNIT IN A CARGO COMPARTMENT OF AN AIRCRAFT

FIELD OF THE DISCLOSURE

This patent relates generally to cargo compartments and, more particularly, to methods and apparatus to position a cargo unit in a cargo compartment of an aircraft.

BACKGROUND

Aircraft often include a cargo compartment to stow cargo (e.g., commercial cargo, passenger luggage, military equipment, etc.) during travel. In some examples, the entire aircraft can be re-configured for, or dedicated to, the carriage of cargo rather than passengers. Cargo containers are typically strapped or chained to the floor of the cargo compartment to secure the cargo containers during flight.

SUMMARY

An example linear track system in a cargo compartment of an aircraft includes a first linear synchronous motor (LSM) track coupled to a floor of the cargo compartment, a second LSM track coupled to the floor of the cargo compartment, and a cargo positioning system to activate the first and second LSM tracks to move a cargo unit along the first and second LSM tracks through the cargo compartment. A bottom of the cargo unit has first and second strips of conductive material to interact with the respective first and second LSM tracks.

An example method of moving a cargo unit within a cargo compartment of an aircraft includes determining a desired position for the cargo unit. The cargo unit is disposed at a current position on a floor of the cargo compartment. First and second linear synchronous motor (LSM) tracks are coupled to the floor. The cargo unit has first and second strips of conductive material disposed on a bottom of the cargo unit. The first and second strips are aligned above the respective first and second LSM tracks. The example method further includes activating the first and second LSM tracks to move the cargo unit from the current position to the desired position.

An example non-transitory computer readable medium includes instructions that, when executed, cause at least one processor to determine a cargo unit is in a desired position in a cargo compartment of an aircraft in which a set of blocks of ferromagnetic material on a bottom of the cargo unit are aligned above a set of electromagnets in a floor of the cargo compartment, and activate the set of electromagnets to magnetically attract the set of blocks to the set of electromagnets to lock the cargo unit in the desired position.

BRIEF DESCRIPTION OF THE DRAWINGS

FIG. 4A is a top view of a section of the example linear track system of FIG. 2.

FIG. 4B is a side view of a section of an example linear synchronous motor (LSM) track of the example linear track system of FIG. 4A. FIG. 4B shows a plurality of alternating current (AC) electromagnets of the example LSM track being activated to move an example cargo unit.

FIG. 4C is a side view of the section of the example LSM track of FIG. 4B showing a direct current (DC) electromagnet being activated to lock an example cargo unit in place.

Figure 1:
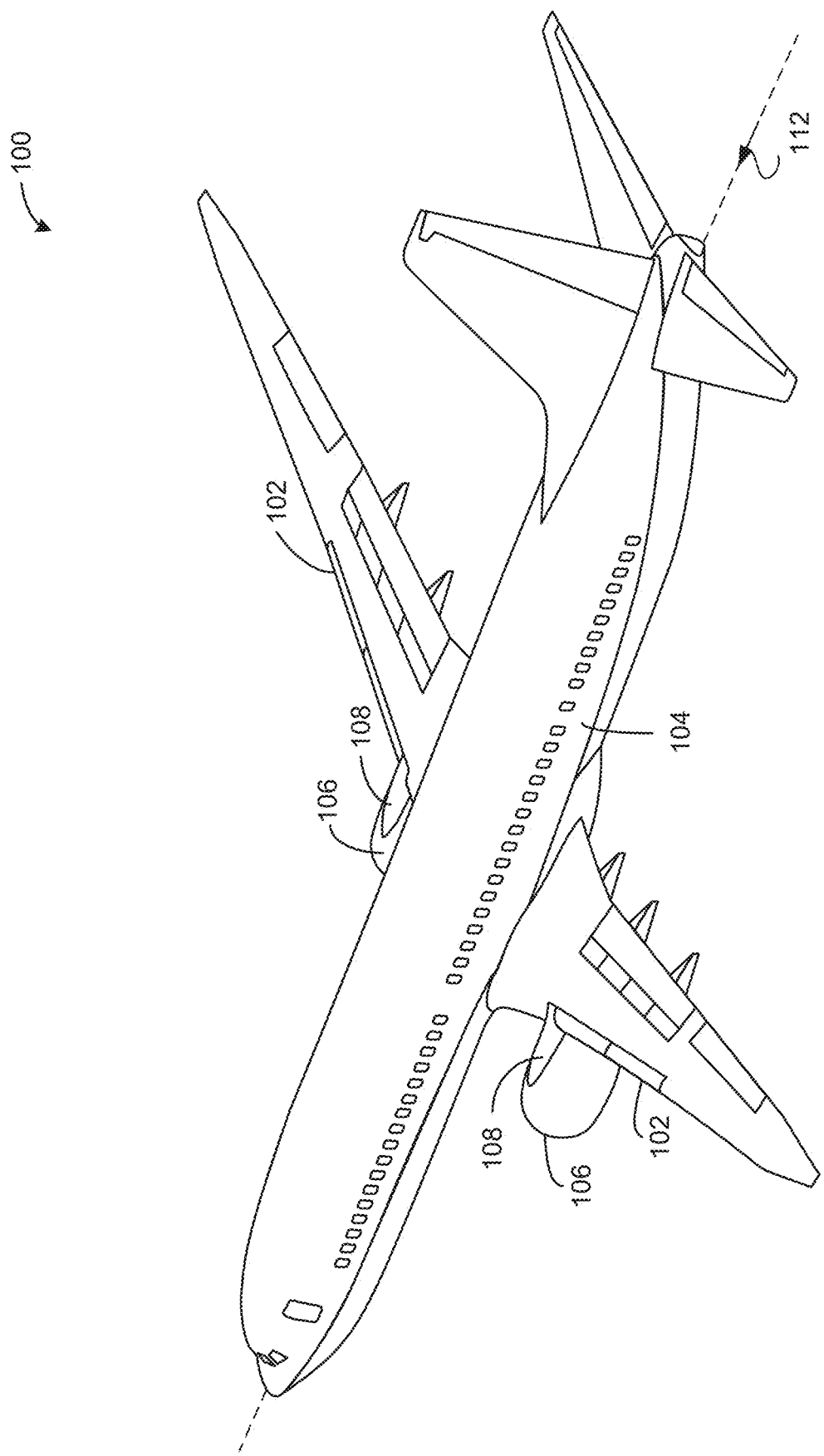
FIG. 1 illustrates an example aircraft in which the examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Many known aircraft (e.g., passenger aircraft, freight aircraft, military aircraft, etc.) include a cargo compartment (sometimes referred to as cargo hold) in which cargo is stowed. For example, some passenger aircraft include a cargo compartment below a passenger compartment to store cargo. Freight aircraft (e.g., a cargo aircraft, a freighter, an airlifter, a cargo jet, etc.) include a cargo compartment that consumes a substantial portion of the aircraft to enable the freight aircraft to transport a greater amount of cargo relative to a passenger aircraft. Cargo may include any objects being transported by the aircraft, such as passenger luggage and/or freight (e.g., raw materials, manufactured materials, merchandise, mail, etc.).

Cargo (e.g., one or more pieces of cargo) is often bundled or packaged into a cargo unit (which is also referred to as a unit load device (ULD)). A cargo unit may be, for example, a container having one or more pieces of cargo or a pallet with one or more pieces of cargo secured to the pallet. This enables a large quantity of cargo to be packaged together into a single unit. Multiple cargo units can be loaded and stored in a cargo compartment of the aircraft. The cargo units may be sized and shaped to fit efficiently within the cargo compartment (e.g., to consume the maximum amount of available space). Further, this results in loading and/or unloading of fewer overall units (as compared to loading each individual piece of cargo). Cargo units are placed within the cargo compartment in accordance with defined limitations based on the selected cargo units and the aircraft designated to transport the cargo units. For example, cargo units should be positioned in the cargo compartment such that a minimum amount of air space (e.g., 50 mm) is provided between the cargo units and the walls of the aircraft fuselage (e.g., a hold liner in the cargo compartment). This safety feature allows for smoke and subsequently halon (e.g., a liquefied, compressed gas used for fire extinguishing) to circulate throughout the cargo hold in the event of a fire, whereas a lack of air space would prevent smoke from reaching smoke detectors and/or the emitted halon from reaching the fire source. Further, hold liners within the cargo compartment that form a fire barrier could be punctured by improperly positioned cargo units.

Cargo containers are typically loaded into the cargo compartment using a loader (e.g., a scissor lift). The loader may have a platform on which one or more cargo units are supported. The platform can be raised and aligned with a cargo hatch, which is an opening in the fuselage to the cargo compartment. The platform may have a conveyor belt or electric rollers that move the cargo units onto the floor in the cargo compartment.

Once a cargo unit is loaded into the cargo compartment, the cargo unit is moved to a desired location in the cargo compartment. In some known aircraft, the floor of the cargo compartment includes rows of rollers. The cargo unit can be slid along the rollers to a desired location. The cargo unit may be pushed or pulled manually (e.g., via one or more crew members). Once the cargo unit is positioned in the desired location, the cargo unit is locked or secured to the floor. Known aircraft include metal locks or latches connected to the floor at regular intervals. The cargo unit is attached directly to the locks or latches at a corresponding location, or may be attached to the locks or latches via straps or chains. This process of physically moving the cargo unit in the cargo compartment and locking the cargo unit in place takes significant time. Further, if an oversized cargo unit is used, the locks need to be rearranged. However, locks can become stuck and difficult to adjust (e.g., requiring hammering to position the lock in place). Delays caused by such readjustments can result in subsequent delays in the flight schedule and unintended disruptions in airline operations. Therefore, manual loading of cargo units can be time consuming and expensive. Further, this manual loading can present safety concerns. For example, the rollers in the floor may be considered a tripping hazard.

Example methods and apparatus to position a cargo unit in a cargo compartment are disclosed herein. The example methods and apparatus can be implemented in connection with a cargo compartment of an aircraft, for example. The examples disclosed herein enable a cargo unit to be easily moved to a desired location in a cargo compartment and temporarily locked or secured to a floor in the cargo compartment without physical interaction of the crew members. This improves safety as the crew members are not required to manually move and lock/unlock the cargo units to/from the floor as seen in known aircraft.

Disclosed herein is an example linear track system that can be implemented in a cargo compartment for moving one or more cargo units to various positions in the cargo compartment. For example, the linear track system can be used to move a cargo unit from a hatch to a desired position in the cargo compartment where the cargo unit is to be secured during flight. The example linear track system includes a set of linear synchronous motor (LSM) tracks that are coupled to (e.g., embedded in) the floor of the cargo compartment. The LSM tracks can be activated to move a cargo unit to any location along the LSM tracks. In some examples, the cargo unit includes strips of conductive material (e.g., copper, aluminum, etc.) coupled to the bottom of the cargo unit. The strips of conductive material are aligned along the LSM tracks. The LSM tracks include electromagnets that are powered with alternating current (AC) power, which creates a moving magnetic field wave that moves the conductive strips along the LSM tracks, thereby moving the cargo unit through the cargo compartment. The LSM tracks can be activated and deactivated to move the cargo unit anywhere along the LSM tracks.

In some examples, the linear track system can also be used to lock the cargo unit to the floor, such that the cargo unit does not move around in the cargo compartment during flight. For example, the LSM tracks can include additional electromagnets that are powered by direct current (DC) power. These DC electromagnets may be spaced at a particular interval along the LSM tracks corresponding to specific positions. The cargo unit can include blocks of ferromagnetic material (e.g., iron, cobalt, nickel, etc.) coupled to the bottom of the cargo unit. The cargo unit is moved to a position in which the blocks of ferromagnetic material are aligned over a set of the DC electromagnets. The set of the DC electromagnets at that position can then be activated, which attracts the blocks on the bottom of the cargo unit to the set of the DC electromagnets, thereby securing the cargo unit to the floor. As such, the examples disclosed herein permit efficient loading/unloading of cargo that can take place autonomously without the need for manual adjustments while providing a method of securely locking cargo units in place to ensure proper positioning during transport.

Turning to the figures, FIG. 1 illustrates an example aircraft 100 in which the examples disclosed herein can be implemented. The aircraft 100 may be a manned aircraft (e.g., controlled via one or more pilots in the aircraft 100) or an unmanned aerial vehicle (UAV). In the illustrated example, the aircraft 100 includes a fuselage 104 and wings 102 (e.g., a right wing and a left wing) extending laterally outward from the fuselage 104. Each of the wings 102 of the illustrated example supports an aircraft engine 106 via a pylon 108. A longitudinal axis 112 of the aircraft 100 is labeled in FIG. 1. A cargo compartment is defined within the fuselage 104. The cargo compartment is used to stow cargo during flight of the aircraft 100. In some examples in which the aircraft 100 is a passenger aircraft, the cargo compartment is located below a passenger compartment and stows luggage of passengers, freight (e.g., raw materials, manufactured materials, merchandise, etc.), mail and/or other cargo. In some examples in which the aircraft 100 is a freight aircraft (e.g., a cargo aircraft, a freighter, an airlifter, a cargo jet, etc.) and/or a military aircraft, the cargo compartment consumes a substantial portion of the fuselage 104 of the aircraft 100 to enable the cargo compartment to stow a large amount of freight, military equipment and/or other cargo.

Figure 2:
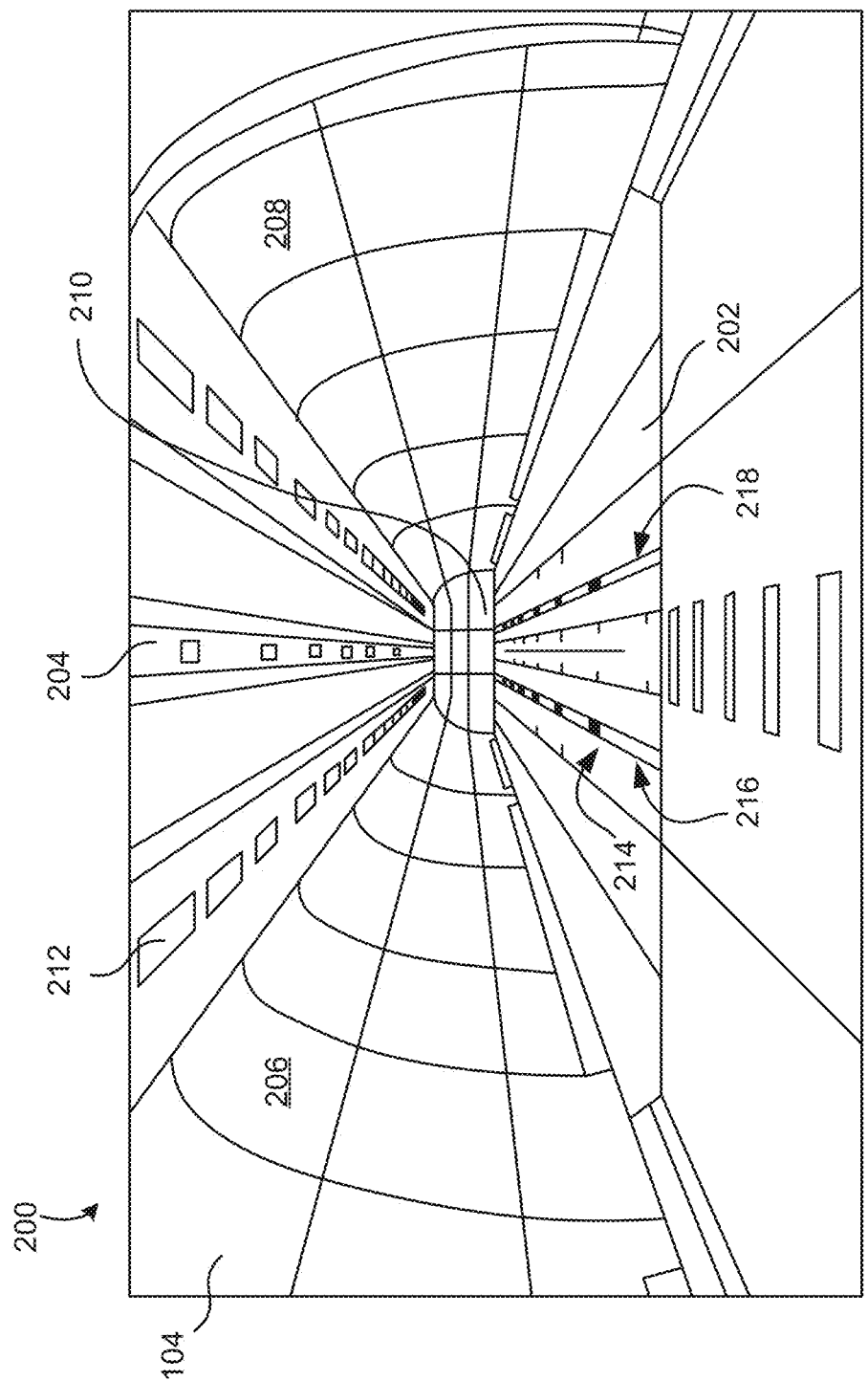
FIG. 2 illustrates an example aircraft cargo compartment of the example aircraft of FIG. 1, with an example linear track system constructed in accordance with the teachings disclosed herein.

FIG. 2 illustrates an example cargo compartment 200 defined in the fuselage 104 of the aircraft 100 (FIG. 1). As illustrated in FIG. 2, the cargo compartment 200 is defined by a floor 202, a ceiling 204, and first and second side walls 206, 208 extending between the floor 202 and the ceiling 204. In the illustrated example, the cargo compartment 200 also has an end wall 210 between the floor 202, the ceiling 204, and the first and second side walls 206, 208. In the illustrated example, the cargo compartment 200 includes a lighting system 212 on the ceiling 204 to provide light to the cargo compartment 200. In this example, a hatch (e.g., an opening in the fuselage 104) to the cargo compartment 200 is located opposite of the end wall 210. The hatch may be covered by a removable or openable door. The hatch enables cargo to be inserted into and/or removed from the cargo compartment 200. In other examples, the hatch can be positioned along another wall of the cargo compartment 110 (e.g., on the first side wall 206, on the second side wall 208, the end wall 210). In some examples, multiple hatches are provided.

In the illustrated example, the cargo compartment 200 includes an example linear track system 214 constructed in accordance with the teachings of this disclosure. The linear track system 214 is at least partially disposed in the floor 202. The linear track system 214 is used to move one or more cargo units loaded into the cargo compartment 200 to desired locations or positions within the cargo compartment 200. For example, the linear track system 214 can be used to move a cargo unit along the floor 202 from a hatch to a desired position in the cargo compartment 200 where the cargo unit is to be stored during flight. The linear track system 214 is also used to lock the one or more cargo units to the floor 202, such that the cargo units do not move around in the cargo compartment 200 during flight. When it is desired to remove the cargo units, the linear track system 214 can unlock the cargo unit(s) from the floor 202 and move the cargo unit(s) toward the hatch. Example cargo units that can be used with the example linear track system 214 are disclosed in further detail in connection with FIGS. 5A and 5B.

In the illustrated example, the linear track system 214 includes a first track 216 and a second track 218. The first and second tracks 216, 218 are parallel to each other. As disclosed in further detail herein, the first and second tracks 216, 218 include linear synchronous motor tracks that can be activated to move a cargo unit along the first and second tracks 216, 218 and, thus, along the floor 202. Multiple cargo units can be moved along the first and second tracks 216, 218 to form a row of cargo units in the cargo compartment. In the illustrated example, the first and second tracks 216, 218 extend the length of the cargo compartment 200. As such, the first and second tracks 216, 218 can be used to move a cargo unit to any position along the length of the cargo compartment 200. In other examples, the first and second tracks 216, 218 may not extend the length of the cargo compartment 200. In the illustrated example, the first and second tracks 216, 218 are positioned to move cargo units along a center of the cargo compartment (e.g., along the longitudinal axis 112 (FIG. 1)). In other examples, the first and second tracks 216, 218 may be disposed in another location (e.g., closer to the first side wall 206). In some examples, the linear track system 214 can include multiple sets of tracks disposed in the cargo compartment 200, such that multiple rows of cargo units can be loaded into and/or removed from the cargo compartment 200.

In some examples, one or more cargo units are loaded into the cargo compartment 200 via a loader (e.g., a hydraulic lift). The cargo units are slid onto the floor 202 over the first and second tracks 216, 218 near the hatch. Then, the linear track system 214 can be activated to move the cargo units to their desired positions. Additionally, when unloading the cargo units, the linear track system 214 can be activated to move the cargo units back toward the hatch, where the loader can retrieve the cargo units.

Figure 3:
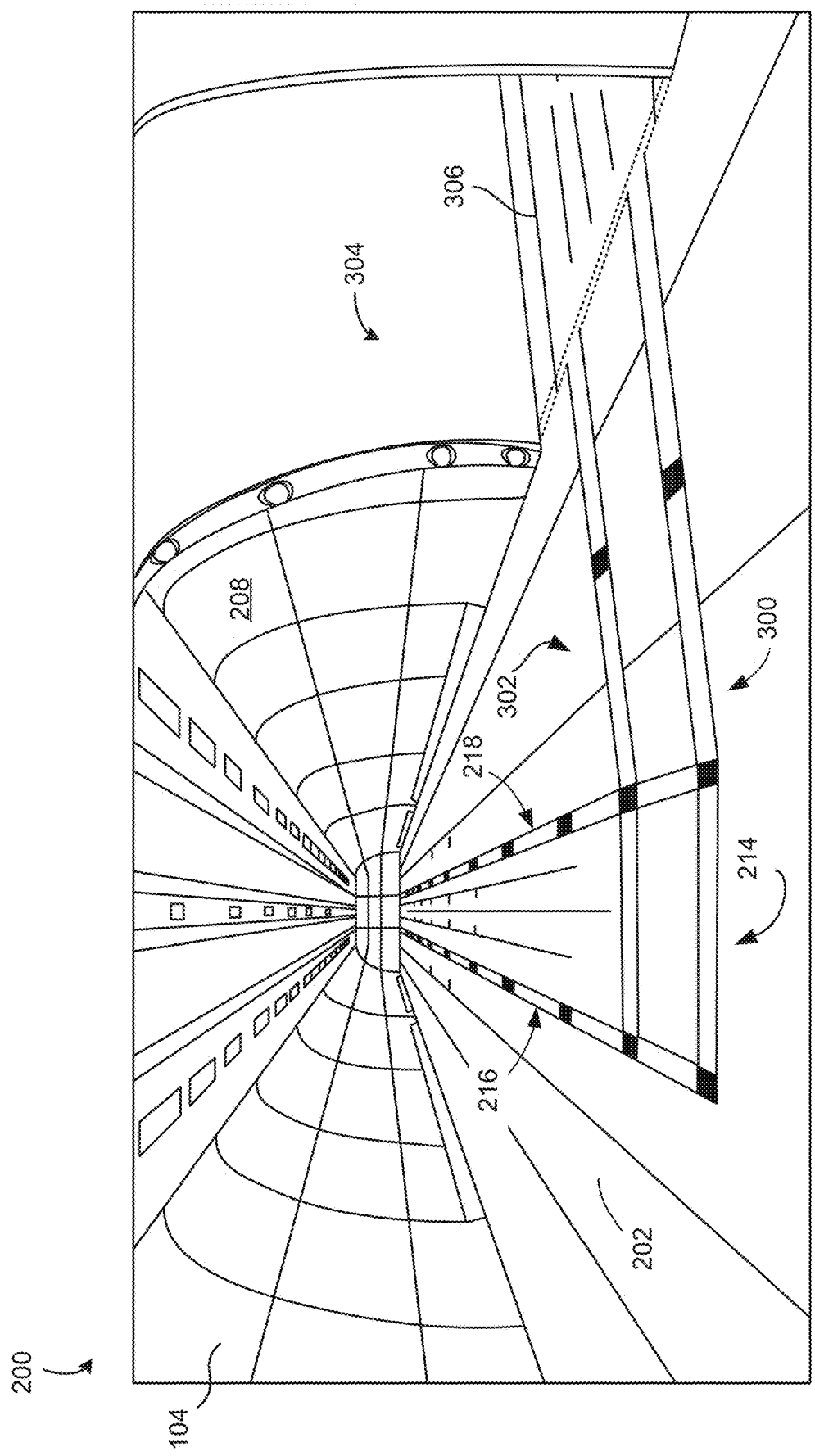
FIG. 3 illustrates an example in which the example linear track system of FIG. 2 includes perpendicular tracks.

In some examples, the linear track system 214 includes tracks for moving cargo units in a direction that is perpendicular to the first and second tracks 216, 218. For example, FIG. 3 shows an example in which the linear track system 214 includes third and fourth tracks 300, 302 that are perpendicular to the first and second tracks 216, 218. This may be useful when the cargo hatch is in a side wall of the cargo compartment 200. For example, as shown in FIG. 3, the fuselage 104 includes a hatch 304 in the second side wall 208. The hatch 304 may be covered by a door that can be removed or opened when loading and/or unloading cargo units. An example loader 306 is shown in FIG. 3. The loader 306 can be used to slide a cargo unit onto the floor 202 over the third and fourth tracks 300, 302. The third and fourth tracks 300, 302 can be activated to move the cargo unit to the first and second tracks 216, 218. Then, the first and second tracks 216, 218 can be activated to move the cargo unit to a desired position within the cargo compartment 200. The tracks 216, 218, 300, 302 can be similarly activated to move a cargo unit back toward the hatch 304 for unloading. In some examples, the aircraft 100 (FIG. 1) can include multiple hatches, such that cargo units can be loaded and/or unloaded from the aircraft 100 from multiple areas of the aircraft 100 (e.g., aft hold versus forward hold). For example, if the aircraft 100 stops at multiple destinations and loads and/or unloads multiple sets of cargo units that are specific to a given location, the hatches can be used to load and/or unload the cargo from multiple areas of the cargo compartment 200 based on cargo characteristics (e.g., content, final destination, etc.).

Figure 5A:
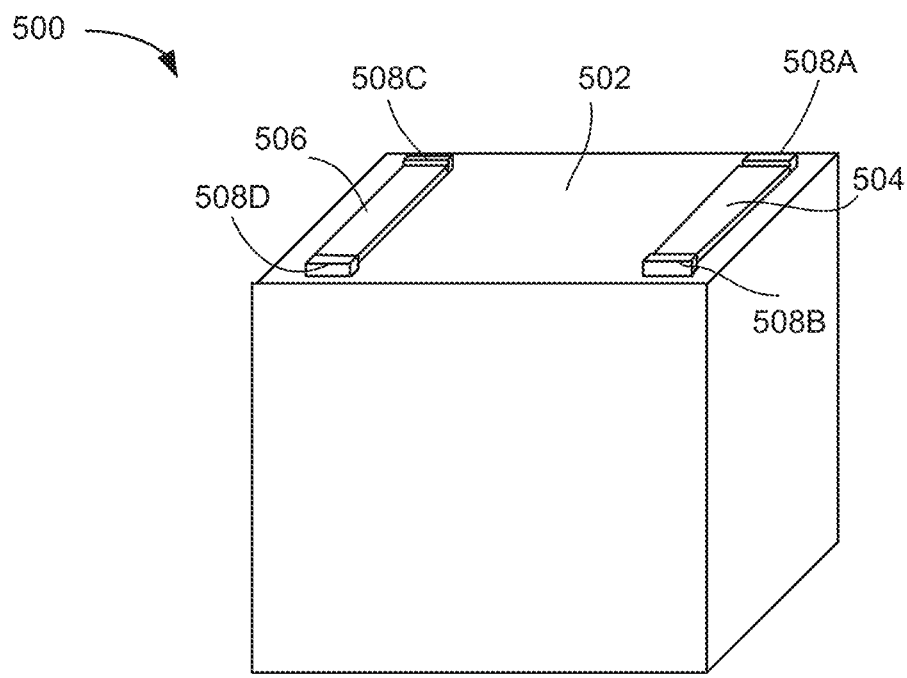
FIGS. 5A and 5B depict example cargo units that can be used with the example linear track system of FIG. 2 and/or FIG. 3 and constructed in accordance with the teachings disclosed herein.

FIG. 4A is a top view of a section of the first and second tracks 216, 218 of the example linear track system 214 in the floor 202. The first track 216 includes a first linear synchronous motor (LSM) track 400 coupled to the floor 202. The first LSM track 400 includes a first series or plurality of electromagnets (shown in in FIG. 4B). The first plurality of electromagnets is activated using alternating current (AC) (and which may also be referred to herein as AC electromagnets). This causes alternating or changing magnetic fields in the first plurality of electromagnets that can be used to move a cargo unit. The second track 218 similarly includes a second LSM track 402 coupled to the floor 202 and having a second plurality of electromagnets. Example cargo units disclosed herein have strips of conductive material on the bottom that are affected by the changing magnetic fields created by the first and second LSM tracks 400, 402. Referring briefly to FIG. 5A, an example cargo unit 500 is illustrated. In this example, the cargo unit 500 is cube or box-shaped. In other examples, the cargo unit 500 may be shaped differently. The cargo unit 500 has a bottom 502. In the illustrated example, a first strip 504 of conductive material (e.g., copper, aluminum, etc.) is coupled to the bottom 502, and a second strip 506 of conductive material is coupled to the bottom 502. The first and second strips 504, 506 are spaced apart and parallel to each other. In particular, the first and second strips 504, 506 are spaced apart from each other the same distance as the first and second tracks 216, 218.

Referring back to FIG. 4A, when the cargo unit 500 (FIG. 5A) is disposed on the floor 202, the first strip 504 (FIG. 5A) is disposed above the first LSM track 400 and the second strip 506 (FIG. 5A) is disposed above the second LSM track 402. When the first and second LSM tracks 400, 402 are activated, the first and second strips 504, 506 are moved linearly along the first and second LSM tracks 400, 402, which thereby moves the cargo unit 500 linearly along the first and second tracks 216, 218 and, thus, moves the cargo unit 500 through the cargo compartment 200 (FIG. 2). As described in further detail in connection with FIG. 4B, the alternating current in the electromagnets of the first and second LSM tracks 400, 402 creates eddy currents in the first and second strips 504, 506. These eddy currents are attracted to or repelled by certain ones of the electromagnets of the first and second LSM tracks 400, 402, which drives the first and second strips 504, 506 linearly along the respective first and second LSM tracks 400, 402. The first and second LSM tracks 400, 402 can be activated to move the cargo unit 500 in either direction (e.g., aft or forward) along the first and second tracks 216, 218. An example system for operating the first and second LSM tracks 400, 402 is disclosed in further detail in connection with FIG. 6.

The first and second LSM tracks 400, 402 can be activated to move the cargo unit 500 and then deactivated once the cargo unit 500 is in a desired position. For example, FIG. 4A shows a first example position 404 for a cargo unit and a second example position 406 for a cargo unit. The cargo unit 500 (FIG. 5A) can be moved to one of the positions 404, 406. Then, a second cargo unit can be moved to the other position. Additionally or alternately, multiple cargo units can be moved simultaneously (e.g., in a row) along the first and second LSM tracks 400, 402 and then stopped when the cargo units reach their desired positions. Thus, multiple cargo units can be moved to positions along the first and second tracks 216, 218 to create a row of cargo units.

In some examples, the linear track system 214 includes one or more position sensor(s) 408. The position sensor(s) 408 is/are used to detect or measure a location of a cargo unit. The position sensor(s) 408 may be any type of sensors, such as pressure sensors, optical sensors, cameras, etc.

In some examples, the first and second LSM tracks 400, 402 can be activated in sections. This allows the first and second LSM tracks 400, 402 to move one or more cargo units while other cargo units can remain stationary. Example track sections 400A-400E and 402A-402E are labeled in FIG. 4A. Assume a first cargo unit is positioned at the first position 404. It may be desired to move a second cargo unit to the second position 406 without moving the first cargo unit. Therefore, only sections 400A-400C and 402A-402C are activated. As a result, the second cargo unit is moved to the second position 406 without moving the first cargo unit positioned at the first position 404. In this manner, multiple cargo units can be arranged in a row along the first and second tacks 216, 218.

In some examples, the tops of the first and second LSM tracks 400, 402 are flush or even with the floor 202 of the cargo compartment 110. For example, the first and second LSM tracks 400, 402 may be disposed in recesses formed in the floor 202 such that the tops are even or flush with the adjacent sections of the floor 202. As such, the first and second LSM tracks 400, 402 do not protrude from the floor 202 and, thus, do not present a tripping hazard like rollers of known cargo compartments. The first and second strips 504, 506 (FIG. 5B) on the cargo unit 500 can slide along the tops of the first and second LSM tracks 400, 402. In other examples, the first and second LSM tracks 400, 402 may be disposed below a flooring panel of the floor 202. As such, a floor panel may be disposed between the first and second LSM tracks 400, 402 and the first and second strips 504, 506. In such an example, the first and second strips 504, 506 slide along the floor panel. In other examples, the first and second LSM tracks 400, 402 may protrude above the floor 202 of the cargo compartment 200 (FIG. 2). In some such examples, the first and second LSM tracks 400, 402 include guide rails to provide guidance and/or stabilization for the cargo units during positioning and/or movement along the first and second tracks 216, 218. In some examples, activation of the first and second LSM tracks 400, 402 creates a strong enough magnetic force that the first and second strips 504, 506 are lifted above the first and second LSM tracks 400, 402. As such, in some examples, an air gap is formed between the first and second strips 504, 506 and the respective first and second LSM tracks 400, 402 when the first and second LSM tracks 400, 402 are activated. In such an example, the cargo unit 500 may not be in direct contact with the floor 202.

To secure the cargo unit(s) in desired positions in the cargo compartment 200 (FIG. 2), the linear track system 214 includes electromagnets powered by direct current (DC) power. For example, as shown in FIG. 4A, the first track 216 includes a third plurality of electromagnets 410 (one of which is referenced in FIG. 4A) coupled to the first LSM track 400 and the second track 218 includes a fourth plurality electromagnets 412 (one of which is referenced in FIG. 4A) coupled to the second LSM track 402. The third and fourth plurality of electromagnets 410, 412 are shown as black squares. Unlike the electromagnets in the first and second LSM tracks 400, 402, which are activated using AC power, the third and fourth plurality of electromagnets 410, 412 are activated using DC power, which can be used to secure the cargo units in place, as disclosed in further detail herein. An example system for controlling the electromagnets 410, 412 is disclosed in further detail in connection with FIG. 6.

As shown in FIG. 4A, the third and fourth plurality of electromagnets 410, 412 are spaced at regular intervals along the respective first and second LSM tracks 400, 402. The cargo units include sets of pieces or blocks of ferromagnetic material on the bottom that are spaced at the same interval. For example, referring back to FIG. 5A, first, second, third, and fourth blocks 508A-508D of ferromagnetic material (e.g., iron, cobalt, nickel, etc.) are coupled to the bottom 502 of the cargo unit 500. In this example, the first and second blocks 508A, 508B are disposed near opposite ends of the first strip 504. Similarly, the third and fourth blocks 508C, 508D are disposed near opposite ends of the second strip 506.

Referring back to FIG. 4A, assume the cargo unit 500 is disposed at the first position 404. In this position, the blocks 508A-508D are aligned above a set of electromagnets of the third and fourth plurality of electromagnets 410, 412. In particular, the first and second blocks 508A, 508B are aligned above two of the third plurality of electromagnets 410 of the first track 216, and the third and fourth blocks 508C, 508D are aligned above two of the fourth plurality of electromagnets 412 of the second track 218. This set of electromagnets can then be activated, which attracts the blocks 508A-508D to the respective electromagnets. This strong magnetic attraction secures the cargo unit 500 to the floor 202 and, thus, locks the cargo unit 500 in place at the first position 404. Similarly, other ones of the electromagnets 410, 412 can be activated when it is desired to lock cargo units at other positions along the first and second tracks 216, 218. In some examples, multiple sets of the electromagnets 410, 412 can be activated at the same time. For example, multiple cargo units may be positioned in their desired positions. Then, multiple sets of the electromagnets 410, 412 can be activated to simultaneously lock the cargo units in place. Similar to the first and second LSM tracks 400, 402, the electromagnets 410, 412 can be flush with the floor 202, below a floor panel, or protrude above the floor 202.

FIG. 4B is an enlarged side view of a section of the first LSM track 400. The second LSM track 402 is substantially the same as the first LSM track 400. Therefore, any of the aspects disclosed in connection with the first LSM track 400 can likewise apply to the second LSM track 402. As disclosed above, the first LSM track 400 includes a first plurality of electromagnets 414 (one of which is referenced in FIG. 4B). The electromagnets 414 are shown as white blocks. Each of the electromagnets 414 includes a coil of wire wrapped around a core (e.g., iron, nickel, cobalt, etc.). To move a cargo unit (e.g., the cargo unit 500 (FIG. 5A)), the electromagnets 414 are activated by supplying the electromagnets 414 with AC power. The AC power causes the magnetic poles or fields to alternate (e.g., switch back-and-forth). These alternating magnetic poles create eddy currents in the first strip 504 of conductive material (FIG. 5A). These eddy currents create magnetic fields that counter or resist the magnetic fields from the electromagnets 414. In some examples, the electromagnets 414 are sequenced or phased (e.g., a two-phase or three-phase arrangement) to create a moving magnetic field wave that moves the first strip 504 of conductive material along the electromagnets 414. In some examples, the electromagnets are operated independently of one another. For example, each of the electromagnets 414 is powered individually according to the designated sequence or phase. In other examples, such as in a three-phase system, the electromagnets 414 of the same phase can be interconnected. For example, as shown in FIG. 4B, every third one of the electromagnets 114 is electrically connected and is driven by the same AC power signal. As such, this arrangement allows each of these electromagnets 414 to be separated by two other electromagnets 414 that are in different phases of the three-phase power. This three-phase arrangement creates a moving magnetic field wave that moves the first strip 504 of conductive material along the electromagnets 414. Thus, the first LSM track 400 and the first strip 504 form a linear motor. As such, the cargo unit 500 can be moved along the first LSM track 400 by powering the electromagnets 414.

The electromagnets 414 can then be deactivated, by ceasing the supply of AC power to the electromagnets 414, when the cargo unit 500 is in the desired position. To reverse the movement of the cargo unit 500, along the first LSM track 400, the current flow can be reversed, thereby changing the direction of the magnetic field wave. As disclosed above, in some examples, certain ones of the electromagnets 414 can be powered such that only certain sections of the first LSM track 400 are activated.

FIG. 4C shows an example in which one of the third plurality of electromagnets 410 is activated to lock the cargo unit 500 (FIG. 5A) in place. In particular, the cargo unit 500 may be stopped at a desired location where the first and second blocks 508A, 508B (FIG. 5A) are aligned over two of the electromagnets 410. Then, certain ones of the electromagnets 410 can be activated using DC power. The DC power produces a stationary magnetic field that attracts the corresponding blocks 508A, 508B toward the corresponding electromagnets 410. The electromagnets 412 (FIG. 4A) on the second LSM track 402 (FIG. 4A) may be similarly activated to attract the third and fourth blocks 508C, 508D (FIG. 5A).

In some examples, the magnetic attraction provided by all four of the electromagnets 410, 412 is sufficient to resist a minimum force required by regulations. For example, cargo locks in aircraft are typically required to be able to resist at least a 9.0 gravitational force (G) load (e.g., the forward direction). Therefore, the electromagnets 410, 412 of the first and second LSM tracks 400, 402 can be sized to create a strong enough attraction that resists at least a 9.0 G load. In some examples, the DC power supplied to the electromagnets 410, 412 can be varied to increase or decrease the strength of the magnetic fields.

In some examples, the electromagnets 410, 412 are powered via power from the aircraft 100 (FIG. 1). For example, the electromagnets 410, 412 may be powered by electrical power produced by a generator powered by one of the aircraft engines 106. Additionally or alternatively, the electromagnets 410, 412 may be powered via a stored power supply, such as one or more batteries on the aircraft 100. In some examples, one or more backup batteries can be provided in the aircraft 100 to provide enough current to power the electromagnets 410 during power outage events. In some examples, these backup batteries are sized to store enough power to keep the cargo units locked in place throughout the entire duration of transport (e.g., flight-based transport, ground-based transport, etc.).

Figure 5B:
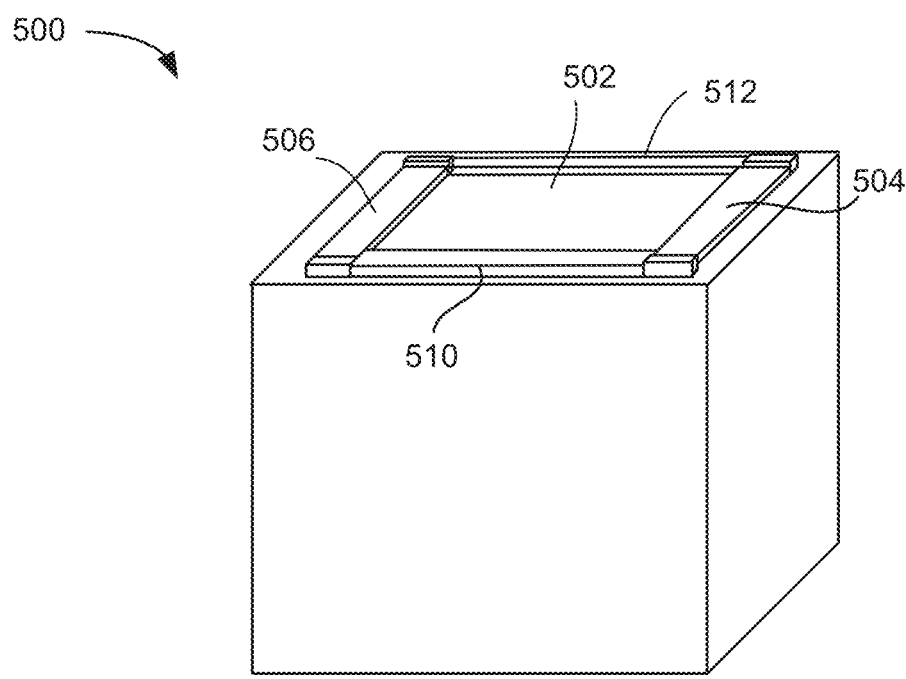

As disclosed above in connection with FIG. 3, in some examples, the linear track system 214 can include one or more perpendicular tracks, such as the third and fourth tracks 300, 302. The third and fourth tracks 300, 302 are structured the same as the first and second tracks 216, 218. To enable a cargo unit to move along the third and fourth tracks 300, 302, one or more additional strips of conductive material can be disposed on the bottom of a cargo unit to match the direction of the third and fourth tracks 300, 302. For example, FIG. 5B shows an example in which the example cargo unit 500 includes third and fourth strips 510, 512 of conductive material coupled to the bottom 502 of the cargo unit 500. The third and fourth strips 510, 512 are spaced apart the same distance as the third and fourth tracks 300, 302 in FIG. 3. The third and fourth tracks 300, 302 include LSM tracks that interact with the respective third and fourth strips 510, 512 the same as the first and second LSM tracks 400, 402 interact with the first and second strips 504, 506 disclosed above.

In the illustrated examples of FIGS. 5A and 5B, the strips 504, 506, 510, 512 and the blocks 508A-508D are coupled to and protrude outward from the bottom 502 of the cargo unit 500. In other examples, the strips 504, 506, 510, 512 and the blocks 508A-508D may be disposed in recesses formed in the bottom 502 such that the outward facing surfaces of the strips 504, 506, 510, 512 and the blocks 508A-508D are flush or even with the bottom.

While in the illustrated examples the linear track system 214 includes two parallel tracks, i.e., the first and second tracks 216, 218, in other examples the linear track system 214 may only include one track. For example, the linear track system 214 can include only a single track coupled to the floor 202 down the center of the cargo compartment 200. In such an example, only one strip of conductive material may be used on the bottom 502 of the cargo unit 500. In other examples, the linear track system 214 can utilize more than two tracks (e.g., three parallel tracks, four parallel tracks, etc.). Further, while in the illustrated example the cargo unit 500 includes four blocks 508A-508D of ferromagnetic material, in other examples the cargo unit 500 can include more or fewer blocks of ferromagnetic material (e.g., one block, two blocks, three blocks, five blocks, etc.).

Figure 6:
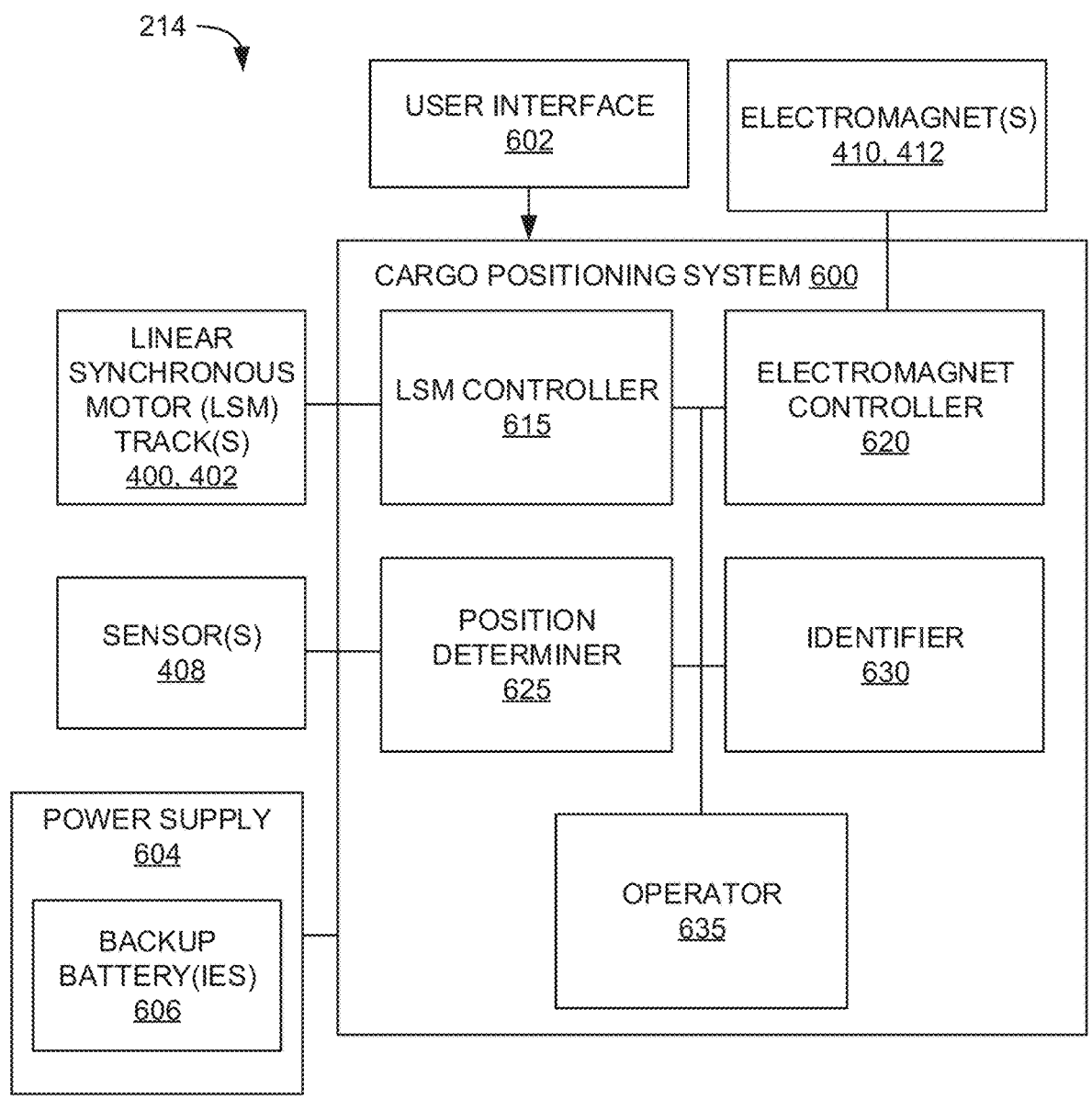
FIG. 6 is a block diagram of the example linear track system of FIG. 2 and/or FIG. 3 having an example cargo positioning system.

FIG. 6 is a block diagram of the example linear track system 214. The linear track system 214 includes a cargo positioning system 600 to control operation of the linear track system 214. In the illustrated example, the cargo positioning system 600 includes an example LSM controller 615, an example electromagnet controller 620, an example position determiner 625, an example identifier 630, and an example operator 635

When a cargo unit, such as the cargo unit 500 (FIG. 5A), is first loaded onto the first and second tracks 216, 218 (FIG. 4A), the operator 635 determines the identity of the cargo unit 500 and a desired position in the cargo compartment 200 (FIG. 2) for the cargo unit 500. In some examples, the operator 635 determines the identity of the cargo unit 500 based on input from the identifier 630. In some examples, the identifier 630 receives input from a device that detects the identity of the cargo unit 500, such as a radio frequency identifier (RFID) reader, a bar code reader, a QR code reader, a camera, etc. Additionally or alternatively, the identifier 630 may determine the identity of the cargo unit 500 based on user input from a user interface 602. The user interface 602 may be an electronic device (e.g., a tablet, a mobile phone, a computer) carried by a crew member or fixedly coupled to a surface in the cargo compartment 200 (e.g., on a side wall in the cargo compartment), for example. A user may enter the identity of the cargo unit 500 into the user interface 602. Once the cargo unit 500 is identified, the operator 635 may store the identity in a memory. The identity may be represented using a container identification system (e.g., owner code, product group code, registration number, size and type code, etc.). In some examples, the cargo unit 500 can be further classified based on operational characteristics (e.g., container weight, payload weight, capacity, etc.). The operator 635 also determines a desired position for the cargo unit 500 in the cargo compartment 200. In some examples, the desired position is input by a user via the user interface 602. Additionally or alternatively, the desired position may be pre-determined. For example, the desired position may be the next available position along the first and second tracks 216, 218.

The position determiner 625 tracks the positions of the cargo units, such as the cargo unit 500, based on input from the positioning sensor(s) 408. In some examples, the positioning sensor(s) 408 include pressure sensor(s). The pressure sensors may be disposed in the floor 202 of the cargo compartment 200. The pressure sensors may be spaced at regular intervals near the first and second tracks 216, 218. The pressure sensors detect pressure from the cargo unit 500 when the cargo unit 500 is above the pressure sensors. In other examples, the positioning sensors 408 may be other types of sensors, such as an optical sensor, a camera, etc.

The LSM controller 615 controls the first and second LSM tracks 400, 402 (as well as any other tracks (e.g., the third and fourth tracks 300, 302 of FIG. 3)) to move a cargo unit through the cargo compartment 200. The LSM controller 615 can activate the first and second LSM tracks 400, 402 to move a cargo unit, such as the cargo unit 500, by supplying AC power to the electromagnets 414 (FIG. 4B) of the first and second LSM tracks 400, 402. Similarly, the LSM controller 615 can deactivate the first and second LSM tracks 400, 402 to stop the cargo unit 500 by ceasing the supply of AC power. For example, once the operator 635 determines a desired position for the cargo unit 500, the operator 635 instructs the LSM controller 615 to activate the first and second tracks 400, 402 to move the cargo unit 500 from the current position toward the desired position. The LSM controller 615 can control the speed of movement of the cargo unit 500 (e.g., by varying frequency and/or amplitude of the AC power). In some examples, the LSM controller 615 only activates certain sections of the first and second LSM tracks 400, 402 (e.g., the section under the cargo unit 500 and the section ahead of the cargo unit 500). While the cargo unit 500 is moving along the first and second LSM tracks 400, 402, the position determiner 625 monitors the current position or location of the cargo unit 500. The current position of the cargo unit 500 is used as feedback to ensure the cargo unit 500 is moving properly (e.g., in the correct direction, at the correct speed, etc.) along the first and second LSM tracks 400, 402. Once the cargo unit 500 reaches the desired position, the operator 635 instructs the LSM controller 615 to deactivate the first and second LSM tracks 400, 402, which causes the cargo unit 500 to stop in the desired position. In some examples, the desired position corresponds to a position in which the blocks 508A-508D are aligned above a set of the electromagnets 410, 412. In some examples, the operator 635 stores a record of the identity of the cargo unit 500 and the position or location of the cargo unit 500 in the cargo compartment 200. This process may be repeated to load multiple cargo units into the cargo compartment 200.

The electromagnet controller 620 controls the electromagnets 410, 412 to lock or unlock the cargo unit 500 to/from the floor 202. When a cargo unit, such as the cargo unit 500, is in the desired position, the operator 635 instructs the electromagnet controller 620 to activate a set of the electromagnets 410, 412 under the cargo unit 500 to lock the cargo unit 500 in place. In particular, the sets of the electromagnets 410, 412 corresponding to each of the positions may be stored in a memory. The electromagnet controller 620 activates the appropriate set of the electromagnets 410, 412 by supplying DC power to the set of the electromagnets 410, 412. When activated, the set of the electromagnets 410, 412 creates strong magnetic fields that attract the blocks 508A-508D on the bottom 502 of the cargo unit 500, thereby locking the cargo unit 500 to the first and second LSM tracks 400, 402 and, thus, locking the cargo unit 500 to the floor 202. The set of the electromagnets 410, 412 may remain activated throughout the duration of the flight to keep the cargo unit 500 from moving. In some examples, the position sensor(s) 408 may be used to confirm the cargo unit 500 is properly locked in place. For example, the position sensor(s) 408 may include pressure sensors. When the set of the electromagnets 410, 412 is activated and the cargo unit 500 is attracted toward the set of the electromagnets 410, 412, the pressure on the floor 202 increases. This increase in pressure can be detected by the pressure sensors and used to confirm the set of the electromagnets 410, 412 were properly activated.

When it is desired to move the cargo unit 500 to another location (e.g., for unloading), the operator 635 instructs the electromagnet controller 620 to deactivate the set of the electromagnets 410, 412. As such, the electromagnet controller 620 ceases the supply of DC power to the set of the electromagnets 410, 412. Then, the LSM controller 615 can activate the first and second LSM tracks 400, 402 to move the cargo unit 500 to another location.

As shown in FIG. 6, the linear track system 214 is powered by a power supply 604. The power from the power supply is used to activate the first and second LSM tracks 400, 402 and the electromagnets 410, 412. In some examples, the power supply 604 includes power from a power grid. For example, when the aircraft 100 is parked at a gate of a terminal, the aircraft 100 may be physically connected to a power outlet that provides power from a power grid. Additionally or alternatively, the power supply 604 may include power provided by an auxiliary power unit (APU) or generator on the aircraft 100. In some examples, the power supply 604 includes one or more backup batteries 606 stored on the aircraft 100. The backup batteries 606 may be designated solely for the electromagnets 410, 412. The backup batteries may store enough power to keep the electromagnets 410, 412 activated throughout the entire flight. Therefore, in the event of a power failure in one of the generators, the backup batteries 606 can be used to keep the electromagnets 410, 412 activated.

As disclosed above, in some examples, the operator 635 controls the LSM controller 615 and the electromagnet controller 620 to automatically move a cargo unit and/or lock/unlock a cargo unit. Additionally or alternatively, the LSM controller 615 and the electromagnetic controller 620 can be operated via user input from the user interface 602. For example, a user may desire to control the movement of the cargo unit 500. The user may be standing in the cargo compartment 200 and interacting with the user interface 602. The user may press a button on the user interface 602, for example, to activate the first and second LSM tracks 400, 402. In some examples, the user can control which sections of the first and second LSM tracks 400, 402 are activated. The user watches as the cargo unit 500 moves along the first and second LSM tracks 400, 402 through the cargo compartment 200. When the cargo unit 500 reaches a desired position, the user may release the button (or press another button), which deactivates the first and second LSM tracks 400, 402 to stop the cargo unit 500 in the desired position. Then, the user may then press another button on the user interface 602, for example, to activate the set of the electromagnets 410, 412 at the desired position, which locks the cargo unit 500 in place. When it is desired to remove the cargo unit 500 from the cargo compartment 200, the user may use the user interface 602 to unlock the cargo unit 500 and move the cargo unit 500 toward the hatch.

While an example manner of implementing the cargo positioning system 600 is illustrated in FIG. 6, one or more of the elements, processes and/or devices illustrated in FIG. 6 may be combined, divided, re-arranged, omitted, eliminated and/or implemented in any other way. Further, the example LSM controller 615, the example electromagnet controller 620, the example position determiner 625, the example identifier 630, the example operator 635, and/or, more generally, the example cargo positioning system 600 of FIG. 6 may be implemented by hardware, software, firmware and/or any combination of hardware, software and/or firmware. Thus, for example, any of the example LSM controller 615, the example electromagnet controller 620, the example position determiner 625, the example identifier 630, the example operator 635, and/or, more generally, the example cargo positioning system 600 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example LSM controller 615, the example electromagnet controller 620, the example position determiner 625, the example identifier 630, and/or the example operator 635 is/are hereby expressly defined to include a non-transitory computer readable storage device or storage disk such as a memory, a digital versatile disk (DVD), a compact disk (CD), a Blu-ray disk, etc. including the software and/or firmware. Further still, the example cargo positioning system 600 of FIG. 6 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
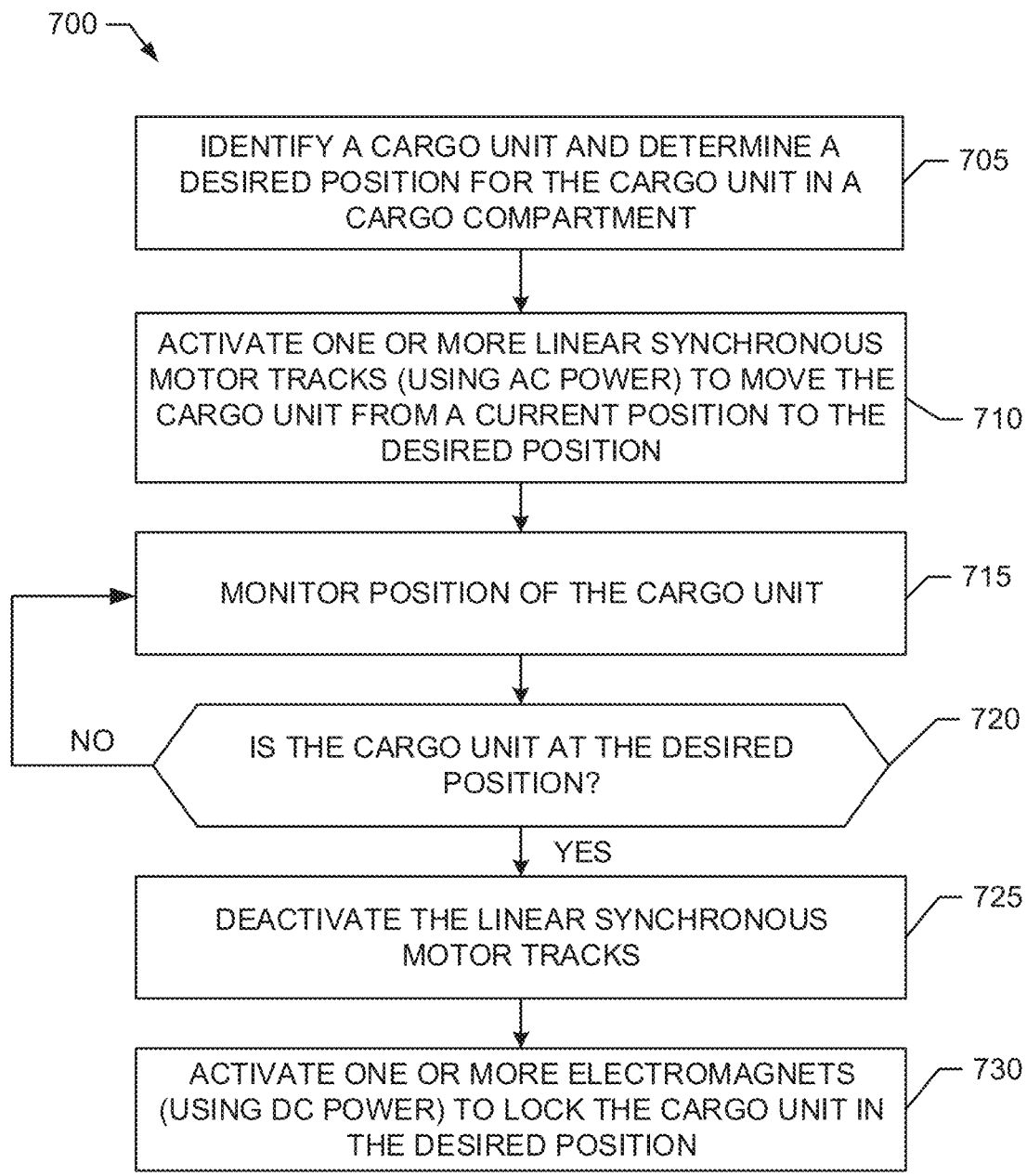
FIG. 7 is a flowchart representative of example machine readable instructions executed to implement the example cargo positioning system of FIG. 6.

A flowchart representative of example hardware logic, machine readable instructions, hardware implemented state machines, and/or any combination thereof for implementing the cargo positioning system 600 of FIG. 6 is shown in FIG. 7. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example cargo positioning system 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 is a flowchart representative of an example method 700 to implement the example cargo positioning system 600 of FIG. 6. The example method 700 may be implemented to move a cargo unit from a first position to a second position and then lock the cargo unit in place. The example method 700 is described in connection with the first and second tracks 216, 218 of FIG. 2 and the cargo unit 500 of FIG. 5A.

Prior to the start of the method 700, it is assumed the cargo unit 500 has been loaded onto the floor 202 of the cargo compartment 200 (e.g., near the hatch) and the first and second strips 504, 506 are aligned over the first and second tracks 216, 218. At block 705, the operator 635 identifies the cargo unit 500 and determines a desired position for the cargo unit 500 in the cargo compartment 200. In some examples, the operator 635 identifies the cargo unit 500 based on input from the identifier 630. For example, the identifier 630 may include a scanner (e.g., a bar code scanner, a QR scanner, etc.) to read identifying indicia on the cargo unit 500. In other examples, the identifier 630 can determine the identity of the cargo unit 500 based on the user input from the user interface 602. The operator 635 also determines a desired position for the cargo unit 500 in the cargo compartment 200. In some examples, a user provides the desired position via the user interface 602. In other examples, the desired position may be pre-determined. For example, the desired position may be the next available position in the cargo compartment 200. For example, if the cargo compartment 200 has five positions for cargo units, and two cargo units are positioned at the first and second positions, the next available position is the third position.

At block 710, the LSM controller 615 activates the first and second LSM tracks 400, 402 to move the cargo unit 500 from the current position to the desired position. As described above, the LSM controller 615 activates the first and second LSM tracks 400, 402 by supplying AC power to the electromagnets 414 of the first and second LSM tracks 400, 402. In some examples, the LSM controller 615 activates the entire length of the first and second LSM tracks 400, 402. In other examples, the LSM controller 615 only actives certain sections of the first and second LSM tracks 400, 402. For example, the LSM controller 615 may only activate the sections of the LSM tracks 400, 402 between the current position and the desired location. As a result, cargo units located at other positions along the first and second LSM tracks 400, 402 are not inadvertently moved.

At block 715, the position determiner 625 monitors the position or location of the cargo unit 500 as the cargo unit 500 is moved toward the desired position. In some examples, the position determiner 625 determines the position of the cargo unit 500 based on input from the position sensor(s) 408. At block 720, the position determiner 625 determines whether the cargo unit 500 is at the desired position. If the position determiner 625 determines that the cargo unit 500 is not in the desired position, control returns to block 715 and the position determiner 625 continues to monitor the position of the cargo unit 500.

If the position determiner 625 determines the cargo unit 500 is in the desired position, the LSM controller 615, at block 725, deactivates the first and second LSM tracks 400, 402. The LSM controller 615 may deactivate the first and second LSM tracks 400, 402 by ceasing AC power to the electromagnets 414 of the first and second LSM tracks 400, 402. As a result, the cargo unit 500 stops moving at the desired position. When the cargo unit 500 is in the desired position, the blocks 508A-508D are aligned above corresponding ones of the electromagnets 410, 412.

At block 730, the electromagnet controller 620 activates the set of the electromagnets 410, 412 at the desired position to lock the cargo unit 500 in place. As disclosed above, the electromagnet controller 620 activates the set of the electromagnets 410, 412 by supplying DC power to the set of the electromagnets 410, 412. The electromagnets 410, 412 create a constant magnetic field that attracts corresponding ones of the blocks 508A-508D, thereby securing the cargo unit 500 in the desired position. If another cargo unit is received, the example method 700 can be performed again to move the cargo unit to a desired location and lock the cargo unit in the desired location. To move a cargo unit back to the hatch, the example method 700 may be performed in reverse. For example, the electromagnets 410, 412 are deactivated to unlock the cargo unit 500, and then the first and second LSM tracks 400, 402 are activated to move the cargo unit 500 back toward the hatch.

While the example linear track system 214 is disclosed in connection with the cargo compartment 200, similar linear track systems can be implemented in or on other equipment or areas to create a complete automated moving and locking system. For example, similar linear track systems can be implemented at a packaging facility where the cargo unit is loaded, on the loader that loads the cargo unit into the cargo compartment 200, etc. Examples disclosed herein can also be used in any other type of cargo area and/or in any type of cargo transportation vehicle (e.g., for air, water, and/or land transport) and/or in stationary structures used for storage (e.g., warehouses, etc.).

Figure 8:
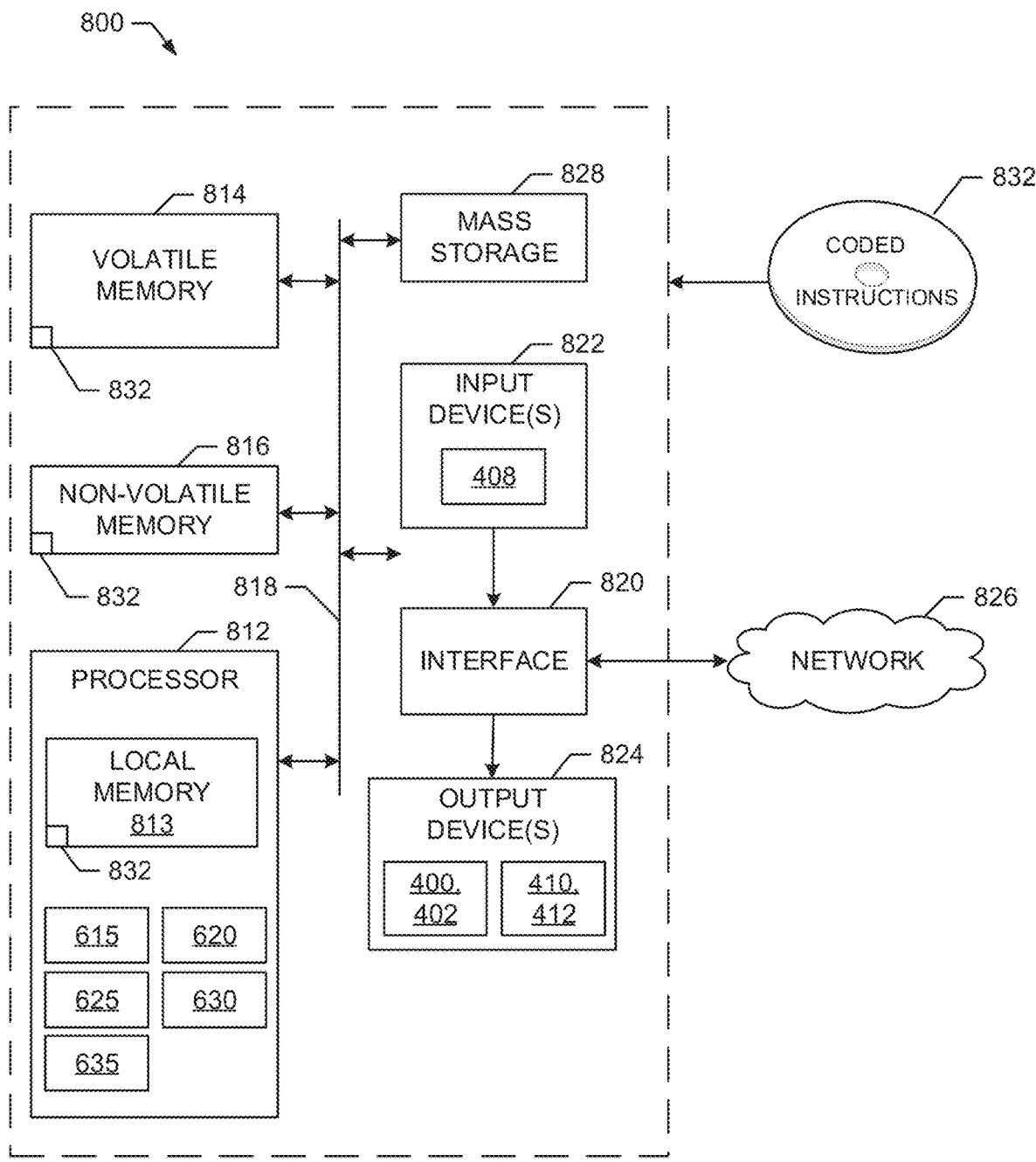
FIG. 8 is a block diagram of an example processing platform structured to execute the instructions of FIG. 7 to implement the example cargo positioning system of FIG. 6.

FIG. 8 is a block diagram of an example processing platform structured to execute the instructions of FIG. 7 to implement the cargo positioning system of FIG. 6. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example LSM controller 615, the example electromagnet controller 620, the example position determiner 625, the example identifier 630, and the example operator 635.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a device and/or a user to enter data and/or commands into the processor 812. In this example, the input device(s) 822 include the sensors 408. Additionally or alternatively, the input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. In this example, the output device 824 include the first and second LSM tracks 400, 402 and the electromagnets 410, 412. Additionally or alternatively, the output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 7 may be stored in the mass storage device 828, in the volatile memory 814, in the non-volatile memory 816, and/or on a removable non-transitory computer readable storage medium such as a CD or DVD.

From the foregoing, it will be appreciated that example methods and apparatus have been disclosed that permit positioning of one or more cargo units in a cargo compartment of an aircraft. For example, a linear track system with linear synchronous motor (LSM) tracks can be used to move a cargo unit from a cargo hatch to a desired position in the cargo compartment. Additionally, the linear track system can be used to lock the cargo unit to the floor, such that the cargo unit does not move around in the compartment during flight. As such, the examples disclosed herein permit efficient loading/unloading of cargo that can take place autonomously without the need for manual adjustments while providing a method of securely locking cargo units in place to ensure proper positioning during transport. While examples disclosed herein are shown in the context of aircraft, examples disclosed herein can be implemented in any appropriate type of vehicle (e.g., spacecraft, watercraft, etc.) and/or other types of aircraft (e.g., UAVs, etc.).

Example methods, apparatus, and articles of manufacture to position a cargo unit are disclosed herein. Further examples and combinations thereof include the following:

Example 1 is a linear track system in a cargo compartment of an aircraft includes a first linear synchronous motor (LSM) track coupled to a floor of the cargo compartment, a second LSM track coupled to the floor of the cargo compartment, and a cargo positioning system to activate the first and second LSM tracks to move a cargo unit along the first and second LSM tracks through the cargo compartment. A bottom of the cargo unit has first and second strips of conductive material to interact with the respective first and second LSM tracks.

Example 2 includes the linear track system of Example 1, wherein the first LSM track includes a first plurality of electromagnets and the second LSM track includes a second plurality of electromagnets. The cargo positioning system is to activate the first and second LSM tracks by supplying alternating current (AC) power to the first and second plurality of electromagnets.

Example 3 includes the linear track system of Example 2, further including a third plurality of electromagnets coupled to the first LSM track, and a fourth plurality of electromagnets coupled to the second LSM track. The third and fourth plurality of electromagnets are spaced at regular intervals along the respective first and second LSM tracks.

Example 4 includes the linear track system of Example 3, wherein the cargo positioning system is to activate a set of electromagnets of the third and fourth plurality of electromagnets to lock the cargo unit in place.

Example 5 includes the linear track system of Example 4, wherein the cargo positioning system is to activate the set of electromagnets by supplying direct current (DC) power to the set of electromagnets, and wherein the set of electromagnets are to attract corresponding blocks of ferromagnetic material on the bottom of the cargo unit.

Example 6 includes the linear track system of Example 5, further including backup batteries for supplying the DC power to the set of electromagnets.

Example 7 includes the linear track system of Examples 5 or 6, wherein the set of electromagnets are to magnetically attract the blocks of ferromagnetic material on the bottom of the cargo unit to resist at least a 9.0 gravitational force (G) load.

Example 8 includes the linear track system of any of Examples 1-7, further including a plurality of sensors to detect a current position of the cargo unit.

Example 9 includes the linear track system of any of Examples 1-8, wherein the tops of the first and second LSM tracks are even with the floor.

Example 10 is method of moving a cargo unit within a cargo compartment of an aircraft. The method includes determining a desired position for the cargo unit. The cargo unit is disposed at a current position on a floor of the cargo compartment. First and second linear synchronous motor (LSM) tracks are coupled to the floor. The cargo unit has first and second strips of conductive material disposed on a bottom of the cargo unit. The first and second strips are aligned above the respective first and second LSM tracks. The method further includes activating the first and second LSM tracks to move the cargo unit from the current position to the desired position.

Example 11 includes the method of Example 10, further including deactivating the first and second LSM tracks when the cargo unit is in the desired position.

Example 12 includes the method of Example 11, wherein a first plurality of electromagnets are coupled to the first LSM track and a second plurality of electromagnets are coupled to the second LSM track. The first and second plurality of electromagnets are spaced at regular intervals along the respective first and second LSM tracks. The method further includes, subsequent to deactivating the first and second LSM tracks, activating a set of electromagnets of the first and second plurality of electromagnets to lock the cargo unit in the desired position.

Example 13 includes the method of Example 12, wherein the cargo unit includes blocks of ferromagnetic material on the bottom of the cargo unit. The blocks of ferromagnetic material are aligned above the set of electromagnets when the cargo unit is in the desired position.

Example 14 includes the method of Example 13, wherein the activating of the set of electromagnets magnetically attracts the blocks of ferromagnetic material to respective ones of the set of electromagnets.

Example 15 includes the method of Example 14, wherein the activating of the set of electromagnets includes supplying direct current power (DC) power to the set of electromagnets.

Example 16 includes the method of Examples 14 or 15, wherein the magnetic attraction between the set of electromagnets and the blocks of ferromagnetic material resists at least a 9.0 gravitational force (G) load.

Example 17 includes the method of any of Examples 10-16, further including monitoring a location of the cargo unit via a position sensor.

Example 18 is a non-transitory computer readable medium including instructions that, when executed, cause at least one processor to determine a cargo unit is in a desired position in a cargo compartment of an aircraft in which a set of blocks of ferromagnetic material on a bottom of the cargo unit are aligned above a set of electromagnets in a floor of the cargo compartment, and activate the set of electromagnets to magnetically attract the set of blocks to the set of electromagnets to lock the cargo unit in the desired position.

Example 19 includes the non-transitory computer readable medium of Example 18, wherein the instructions, when executed, cause the at least one processor to activate the set of electromagnets by supplying direct current (DC) power to the set of electromagnets.

Example 20 includes the non-transitory computer readable medium of Examples 18 or 19, wherein the instructions, when executed, cause the at least one processor to, prior to activating the set of electromagnets, activate first and second linear synchronous motor (LSM) tracks in the floor of the cargo compartment to move the cargo unit from a first position to the desired position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A linear track system in a cargo compartment of an aircraft, the linear track system comprising:
   a first linear synchronous motor (LSM) track coupled to a floor of the cargo compartment, the first LSM track including a first plurality of electromagnets;
   a second LSM track coupled to the floor of the cargo compartment, the second LSM track including a second plurality of electromagnets;
   a third plurality of electromagnets coupled to the first LSM track;
   a fourth plurality of electromagnets coupled to the second LSM track; and
   a cargo positioning system to activate the first and second LSM tracks to move a cargo unit along the first and second LSM tracks through the cargo compartment, a bottom of the cargo unit having first and second strips of conductive material to interact with the respective first and second LSM tracks, and wherein the cargo positioning system is to activate a set of electromagnets of the third and fourth plurality of electromagnets to lock the cargo unit in place.

2. The linear track system of claim 1, wherein the cargo positioning system is to activate the first and second LSM tracks by supplying alternating current (AC) power to the first and second plurality of electromagnets.

3. The linear track system of claim 2, wherein the third and fourth plurality of electromagnets are spaced at regular intervals along the respective first and second LSM tracks.

4. The linear track system of claim 1, wherein the cargo positioning system is to activate the set of electromagnets by supplying direct current (DC) power to the set of electromagnets, and wherein the set of electromagnets are to attract corresponding blocks of ferromagnetic material on the bottom of the cargo unit.

5. The linear track system of claim 4, further including backup batteries for supplying the DC power to the set of electromagnets.

6. The linear track system of claim 4, wherein the set of electromagnets are to magnetically attract the blocks of ferromagnetic material on the bottom of the cargo unit to resist at least a 9.0 gravitational force (G) load.

7. The linear track system of claim 1, further including a plurality of sensors to detect a current position of the cargo unit.

8. The linear track system of claim 1, wherein tops of the first and second LSM tracks are even with the floor.

9. A method of moving a cargo unit within a cargo compartment of an aircraft, the method comprising:
   determining a desired position for the cargo unit, the cargo unit disposed at a current position on a floor of the cargo compartment, first and second linear synchronous motor (LSM) tracks coupled to the floor, the cargo unit having first and second strips of conductive material disposed on a bottom of the cargo unit, the first and second strips aligned above the respective first and second LSM tracks;
   activating the first and second LSM tracks to move the cargo unit from the current position to the desired position, wherein a first plurality of electromagnets are coupled to the first LSM track and a second plurality of electromagnets are coupled to the second LSM track;
   deactivating the first and second LSM tracks when the cargo unit is in the desired position; and
   subsequent to deactivating the first and second LSM tracks, activating a set of electromagnets of the first and second plurality of electromagnets to lock the cargo unit in the desired position.

10. The method of claim 9, wherein the first and second plurality of electromagnets are spaced at regular intervals along the respective first and second LSM tracks.

11. The method of claim 9, wherein the cargo unit includes blocks of ferromagnetic material on the bottom of the cargo unit, the blocks of ferromagnetic material aligned above the set of electromagnets when the cargo unit is in the desired position.

12. The method of claim 11, wherein the activating of the set of electromagnets magnetically attracts the blocks of ferromagnetic material to respective ones of the set of electromagnets.

13. The method of claim 12, wherein the activating of the set of electromagnets includes supplying direct current power (DC) power to the set of electromagnets.

14. The method of claim 12, wherein the magnetic attraction between the set of electromagnets and the blocks of ferromagnetic material resists at least a 9.0 gravitational force (G) load.

15. The method of claim 9, further including monitoring a location of the cargo unit via a position sensor.

16. A non-transitory computer readable medium comprising instructions that, when executed, cause at least one processor to at least:
   determine a cargo unit is in a desired position in a cargo compartment of an aircraft in which a set of blocks of ferromagnetic material on a bottom of the cargo unit are aligned above a set of electromagnets in a floor of the cargo compartment, wherein the set of electromagnets includes a first plurality of electromagnets coupled to a first track and a second plurality of electromagnets coupled to a second track;
   activate the first and second tracks to move the cargo unit from a current position to the desired position;
   deactivate the first and second tracks when the cargo unit is in the desired position; and
   subsequent to deactivating the first and second tracks, activate the set of electromagnets to lock the cargo unit in the desired position.

17. The non-transitory computer readable medium of claim 16, wherein the instructions, when executed, cause the at least one processor to activate the set of electromagnets by supplying direct current (DC) power to the set of electromagnets.

18. The non-transitory computer readable medium of claim 16, wherein the first and second tracks are linear synchronous motor (LSM) tracks in the floor of the cargo compartment.

19. The non-transitory computer readable medium of claim 16, wherein the instructions, when executed, cause the at least one processor to activate the first and second tracks by supplying alternating current (AC) power to the first and second plurality of electromagnets.

20. The non-transitory computer readable medium of claim 16, wherein the instructions, when executed, cause the at least one processor to detect a current position of the cargo unit based on input from a sensor.

* * * * *